United States Patent
Ramsey et al.

(10) Patent No.: US 7,840,585 B2
(45) Date of Patent: Nov. 23, 2010

(54) DISCOSQL: DISTRIBUTED PROCESSING OF STRUCTURED QUERIES

(75) Inventors: William D Ramsey, Redmond, WA (US); Ronnie I Chaiken, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 11/761,407

(22) Filed: Jun. 12, 2007

(65) Prior Publication Data

US 2008/0313161 A1 Dec. 18, 2008

(51) Int. Cl.
*G06F 17/30* (2006.01)
*G06F 7/53* (2006.01)

(52) U.S. Cl. .................................................. 707/764
(58) Field of Classification Search ................. 707/760, 707/764
See application file for complete search history.

(56) References Cited

U.S. PATENT DOCUMENTS

| | | | |
|---|---|---|---|
| 5,778,364 A | 7/1998 | Nelson | |
| 5,963,934 A * | 10/1999 | Cochrane et al. | 707/2 |
| 6,078,924 A | 6/2000 | Ainsbury et al. | |
| 6,112,198 A * | 8/2000 | Lohman et al. | 707/3 |
| 6,665,664 B2 | 12/2003 | Paulley et al. | |
| 6,694,311 B1 | 2/2004 | Smith | |
| 6,760,719 B1 * | 7/2004 | Hanson et al. | 707/3 |
| 6,807,546 B2 | 10/2004 | Young-Lai | |
| 6,907,422 B1 | 6/2005 | Predovic | |
| 6,965,831 B2 | 11/2005 | Domany et al. | |
| 6,999,963 B1 | 2/2006 | McConnell | |
| 7,139,752 B2 | 11/2006 | Broder et al. | |
| 2003/0208458 A1 * | 11/2003 | Dettinger et al. | 707/1 |
| 2005/0262108 A1 | 11/2005 | Gupta | |
| 2006/0093223 A1 | 5/2006 | Portigal et al. | |

FOREIGN PATENT DOCUMENTS

WO   WO2006055894 A2   5/2006

OTHER PUBLICATIONS

Taniar et al., "Parallel Processing of Multi-join Expansion_aggregate Data Cube Query in High Performance Database Systems", 2002, IEEE.*

(Continued)

*Primary Examiner*—James Trujillo
*Assistant Examiner*—Dawaune Conyers

(57) ABSTRACT

Structured queries, such as those written using the Structured Query Language (SQL) can be an efficient mechanism for expressing the information sought to be obtained from a collection of data. Mechanisms can enable the use of structured queries to express data processing that can be performed in parallel in order to obtain the attendant efficiencies of such processing. The structured queries, whether standing alone or integrated into another programming context, can be translated into an intermediate form that can be compatible with, or equivalent to, the programming context into which they were integrated or some other high-level programming language. The intermediate, translated form can use core commands that abstract mechanisms that can be executed in parallel. The core commands include commands for applying a function in parallel and distributing and joining data in parallel, and also include aggregations of core commands directed to commonly performed functions.

8 Claims, 10 Drawing Sheets

OTHER PUBLICATIONS

Caragea, "Learning classifiers from distributed, semantically heterogeneous, autonomous data sources", 2004, Iowa State University.*

"S-PLUS 7—Delivering the Power of Predictive Analytics across the Enterprise", available at lease as early as Mar. 2, 2007, at http://www.insightful.com/products/splus/s7_features.asp, Insightful Corporation, 1996-2006, pp. 1-2.

Chen, et al., "Statistical Computing and Databases: Distributed Computing Near the Data", Proceedings of the 3rd International Workshop on Distributed Statistical Computing, Mar. 20-22, 2003.

Goldstein, et al., "A Framework for Knowledge-based Interactive Data Exploration", Journal of Visual Languages and Computing, Dec. 5, 1994, pp. 1-31.

* cited by examiner

DISCOSQL: DISTRIBUTED PROCESSING OF STRUCTURED QUERIES

BACKGROUND

Because of the increasingly interconnected nature of computing devices throughout the world, the data gathered and generated by those computing devices has grown at an exponential rate. The time to process such increasing amounts of data, using traditional methodologies, will, therefore, exponentially increase as well. For businesses, educational and governmental institutions, and others who provide or consume services derived from billions of individual data points, the management of such a large amount of data in an efficient manner becomes crucial. Thus, as the amount of data being gathered and generated increases, the infrastructure for storing, managing, and operating on such data needs to expand as well.

Traditionally, large quantities of data were efficiently handled using fault-tolerant storage systems and parallel-processing algorithms. Fault-tolerant storage systems enabled large quantities of data to be stored across hundreds or even thousands of inexpensive storage media, despite the risks that at least one of these storage media would fail, rendering the data stored on it inaccessible. Parallel-processing, or algorithms enabled large quantities of data to be efficiently gathered and processed by simply dividing the necessary labor across inexpensive processing equipment, such as the multi-core microprocessors present in modern computing hardware.

However, while fault-tolerant storage systems can be implemented in a generic fashion, such that a single fault-tolerant storage algorithm can be used to store any type of information, parallel-processing algorithms are, by their nature, specific to the particular problem that they seek to solve or the particular task that they seek to accomplish. Thus, a search engine can use the same fault-tolerant storage mechanisms as a weather prediction engine, but, obviously, they would each rely on vastly different parallel-processing algorithms.

SUMMARY

Generating the necessary computing instructions to perform parallel-processing can be a daunting task, even for experienced programmers. For example, to generate an algorithm that can take advantage of parallel-processing, programmers must, among other things, take into account a continuously varying number of independent processes, must identify and divide out those aspects of their algorithms that can be performed in parallel, and must account for the communication of information across processes boundaries. In one embodiment, therefore, common structured query commands can be translated into an intermediate form, enabling simplified generation of algorithms that can benefit from parallel-processing. The intermediate form can leverage existing technologies that can include several core commands optimized for parallel-processing that can be used without any advanced knowledge of parallel-processing methodologies. Such core commands can be based on operations that are commonly used in parallel, or distributed, computations, such as the partitioning of data into collections, or "buckets," the aggregating of parallel outputs, the processing of data in parallel, and the joining of two parallel outputs.

In an alternative embodiment, mechanisms can be provided to support the inclusion of structured queries in program code written in a higher-level programming language, such as a language that can provide core commands optimized for parallel-processing. The structured queries can be initially translated into a form compatible with the higher-level programming language, and such a translation can make use of the core commands optimized for parallel-processing. Subsequently, the code originally written in the higher-level programming language, together with the translated form of the structured query, can be compiled into a form optimized for parallel-processing.

In a further alternative embodiment, mechanisms can be provided to support the inclusion structured queries in scripts written using a scripting language, such as a scripting language that can provide core commands optimized for parallel-processing. The structured queries can initially be translated into an intermediate form, such as a form compatible for a higher-level programming language. Subsequently, the translated form of the structured queries can be compiled into a form optimized for parallel-processing while the script can be interpreted into a form optimized for parallel-processing. The interpretation of the script and the compilation of the translated form of the structured queries can both reference an equivalent library directed to the generation of instructions optimized for parallel-processing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
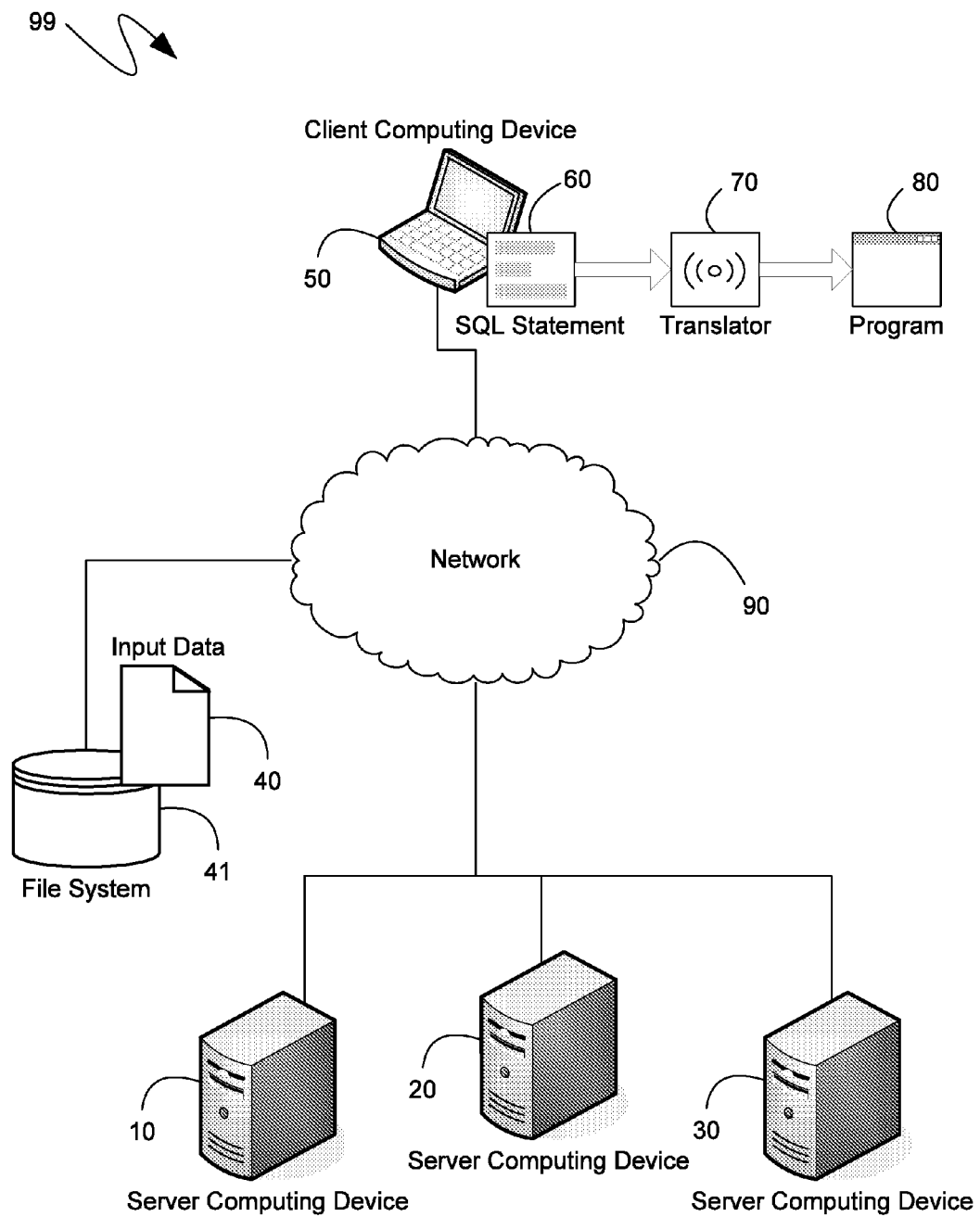
FIG. 1 is a block diagram of an exemplary network comprising multiple interconnected devices, some of which can perform operations in parallel.

The following description relates to the provision of mechanisms for generating instructions optimized for parallel-processing based on one or more structured queries. The structured query can be translated into an intermediate form based on the structured query commands used. In one embodiment, the intermediate form can comprise, or be compatible with, instructions in a higher-level programming language such that subsequent compilation of the intermediate form can leverage pre-existing mechanisms for the generation of instructions optimized for parallel-processing. Stand-alone structured queries can first be translated into an intermediate form and can subsequently be compiled into lower-level computer-executable instructions that can be executed in parallel across multiple processes or processors.

In an alternative embodiment, structured queries can be incorporated with commands and instructions written in a higher level programming language or in a scripting language. Structured queries incorporated with higher-level programming language instructions can first be translated into a form compatible with, or even equivalent to, the higher-level programming language, and subsequently, the translated structured queries and the other higher-level programming language instructions can be compiled into lower-level computer-executable instructions optimized for parallel-processing. Conversely, structured queries incorporated into a script can first be translated into a form compatible with a higher-level programming language, and subsequently, the translated structured queries can be compiled into lower-level computer-executable instructions optimized for parallel-processing while the supporting script can be interpreted into lower-level computer-executable instructions optimized for parallel-processing. In one embodiment, the interpretation of a translated form of a structured query and the compilation of supporting script can both reference equivalent lower-level computer-executable instruction libraries.

The techniques described herein focus on, but are not limited to, the generation of instructions optimized for parallel-processing based on Structured Query Language (SQL) statements. None of the embodiments described below, however, utilize any aspect of the SQL that could not be found in other computer languages directed to structured queries. Consequently, while the specific examples provided below are illustrated using SQL, the descriptions provided herein are not intended to be so limited. Similarly, while the specific examples provided below illustrate the translation of SQL statements into C# statements, there is no aspect of the C# computer programming language that is being relied upon that could not be found in a myriad of other higher-level computer programming languages, such as Visual Basic® or C++. Thus, the mere usage of C# for illustrative purposes is not meant to limit the descriptions below to any specific higher-level computer programming language.

Turning to FIG. 1, an exemplary network system 99 is illustrated comprising the network 90 itself, a client computing device 50, a file system 41, and multiple server computing devices, such as server computing devices 10, 20 and 30, all connected to the network 90. The file system 41 can be local to the client computing device 50, one of the server computing devices 10, 20 or 30, or some other computing device, or it can be distributed among multiple computing devices such as computing devices 10, 20, 30 or 50. The file system 41 can comprise one or more files that can act as input data 40 to which a SQL statement 60 is directed. More specifically, the SQL statement 60 can comprise SQL commands directed to the ordering, sorting or other processing of the input data 40.

In one embodiment, the SQL statement 60 can be processed by a translator 70 that can produce an intermediate form, represented in FIG. 1 as program 80. The program 80 can comprise computer programming commands, including core commands optimized for parallel-processing. The commands of the program 80 can, upon compilation, result in one or more computer-executable programs that can interact with data, such as the input data 40, in the manner specified by the SQL statement 60. While the SQL statement 60 is shown in FIG. 1 as a stand-alone element, in an alternative embodiment, the SQL statement is incorporated into program code written in a higher-level computer programming language, or into a script written in a scripting language. In either case, the SQL statement 60 can still be translated by the translator 70 into an intermediate form, such as the program 80. However, in such cases, the resulting computer-executable program can comprise instructions derived from both the compilation of the program 80 and the compilation of the host program code or the interpretation of the host script.

By being optimized for parallel-processing, the program 80 can, upon compilation, perform the data manipulation specified, at least in part, by the SQL statement 60 orders of magnitude faster than if the processing were performed by a single process. For example, if the input data 40 comprised several hundred terabytes of data, the processing of such data using a single computing device could take days or even weeks to complete. To process data of such size within a reasonable period of time, multiple computing devices, each of which can host one or more independent processes, can independently, and in parallel, process some segment of the input data 40, thereby decreasing the processing time by a factor proportional to the number of independent processes operating in parallel.

Modern server computing devices often comprise multiple processors capable of executing multiple simultaneous processes. Furthermore, virtual machine technologies often enable such server computing devices to execute more processes in parallel than the physical number of processors installed. However, for simplicity of illustration and description only, and not because of any inherent limitation in the mechanisms described, the descriptions below will proceed as if the server computing devices 10, 20 and 30 comprise a single processor capable of simultaneously executing a single process.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
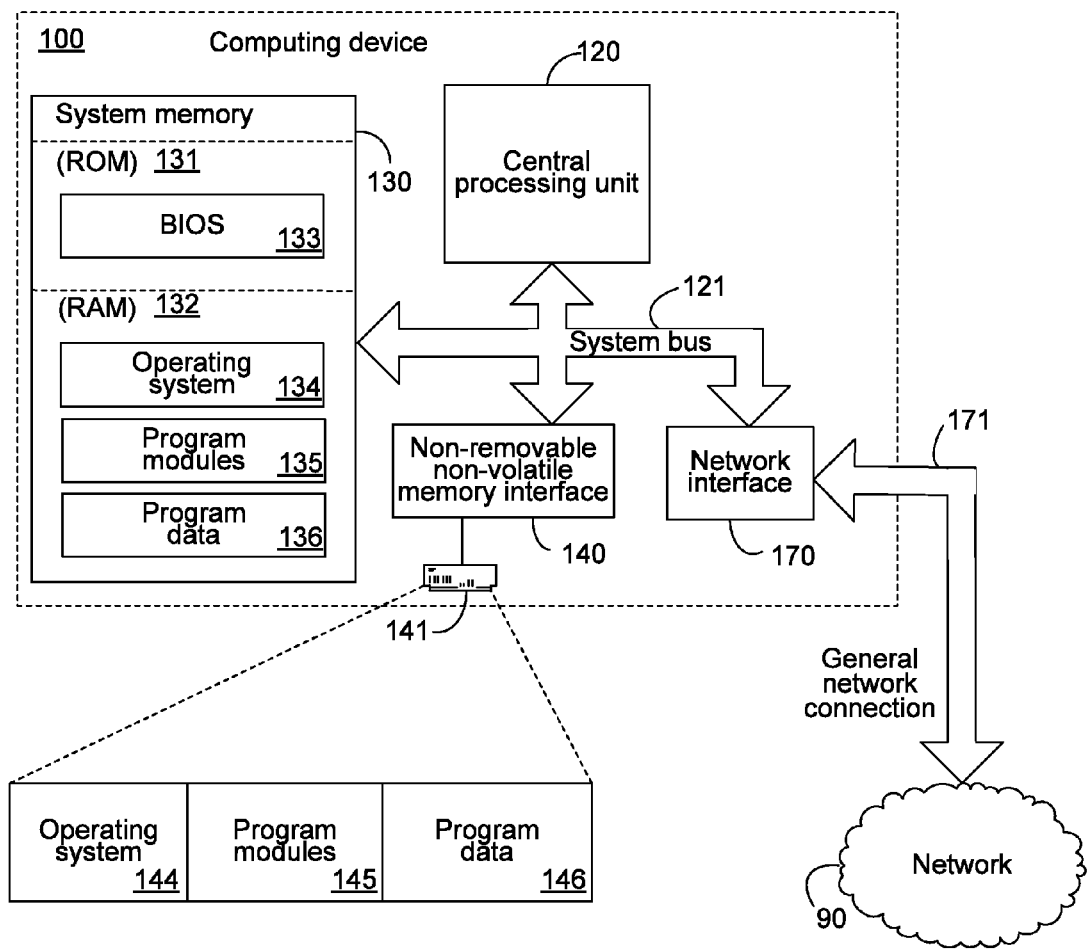
FIG. 2 is a block diagram of an exemplary computing device.

With reference to FIG. 2, an exemplary computing device 100 is illustrated. The computing device 100 can represent any of the computing devices 10, 20, 30 or 50 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Irrespective of the specific network connections and communicational protocols used, however, so long as the computing device 50 can communicate with the server computing devices 10, 20 and 30 in an appropriate manner, the computing device can use the server computing devices to execute, in parallel, a compiled version of the program 80, which can perform functions directed to the input data 40. To enable easier creation of the program 80, core commands can be provided that can be utilized as any other command of a higher level programming language, except that such commands, instead of generating instructions for execution on a single processor, can instead generate the appropriate instructions necessary for proper execution on multiple, parallel processors.

The translator 70 of FIG. 1 can utilize such core commands when transforming the SQL commands of the SQL statement 60 into the program 80. Specifically, the program 80 can comprise higher-level computer programming instructions, including one or more of the core commands described in detail below. Furthermore, the subsequent compiling of the program 80 can make use of the same libraries as would support the core commands when utilized directly by a programmer.

To describe the provision of mechanisms by which structured queries can be performed in parallel, the descriptions below proceed initially with a description of the core commands that can be used to generate the program 80. Subsequent descriptions will then focus on the use of such core commands as part of the process for generating computer-executable instructions optimized for parallel-processing.

Turning to the core commands, one such core command can enable a programmer to apply a function to data in parallel, thereby potentially dramatically decreasing the time required to perform the function, as compared to a serial execution of the function. For example, if the programmer wanted to identify each web page that used a particular word, from among a collection of several billion web pages, the searching function written by the programmer could be executed by several thousand individual processors operating in parallel, using the function to search only a few thousand web pages. The web pages would then be searched several thousand times faster than if a single processor executed the same function to search all several billion web pages by itself.

Figure 3:
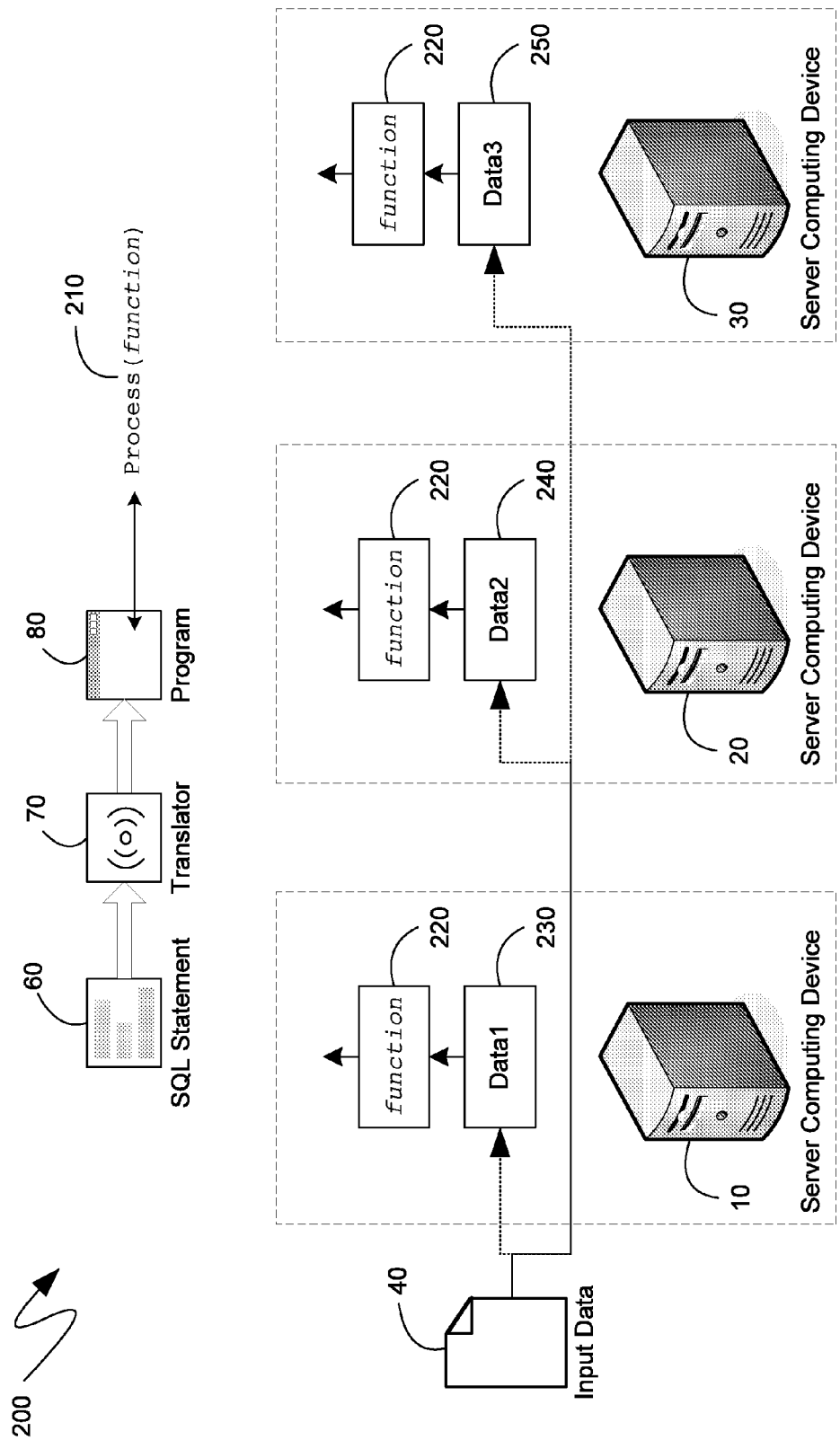
FIG. 3 is a block diagram of a "process" core command.

Turning to FIG. 3, such a core command, referred to hereinafter as the "process" command is illustrated with respect to the functional diagram 200. The use of the process command 210 within the program 80 can enable the performance of the operations illustrated with respect to the server computing devices 10, 20 and 30. Specifically, a programmer can specify a function to be provided as input to the process command 210. The process command 210 can then apply that function in parallel across multiple processes. For example, as shown in FIG. 3, if the function specified by the programmer performed some action with respect to the input data 40, the data could be partitioned into data segments 230, 240 and 250 across server computing devices 10, 20 and 30 and each data segment could then be acted upon by the specified function 220 in parallel as shown.

Because the process core command 210 provides programmers with the ability to process, in parallel, a wide variety of functions that can be written by the programmers themselves to suit their particular needs, the process command can be very versatile. However, there exist several often-used functions, especially within the field of data interaction, that can be provided to a programmer to avoid forcing each programmer to independently write their own versions when such customization is not necessary. Thus, additional core functions are contemplated that provide programmers simplified access to more commonly used data processing functions.

Figure 4:
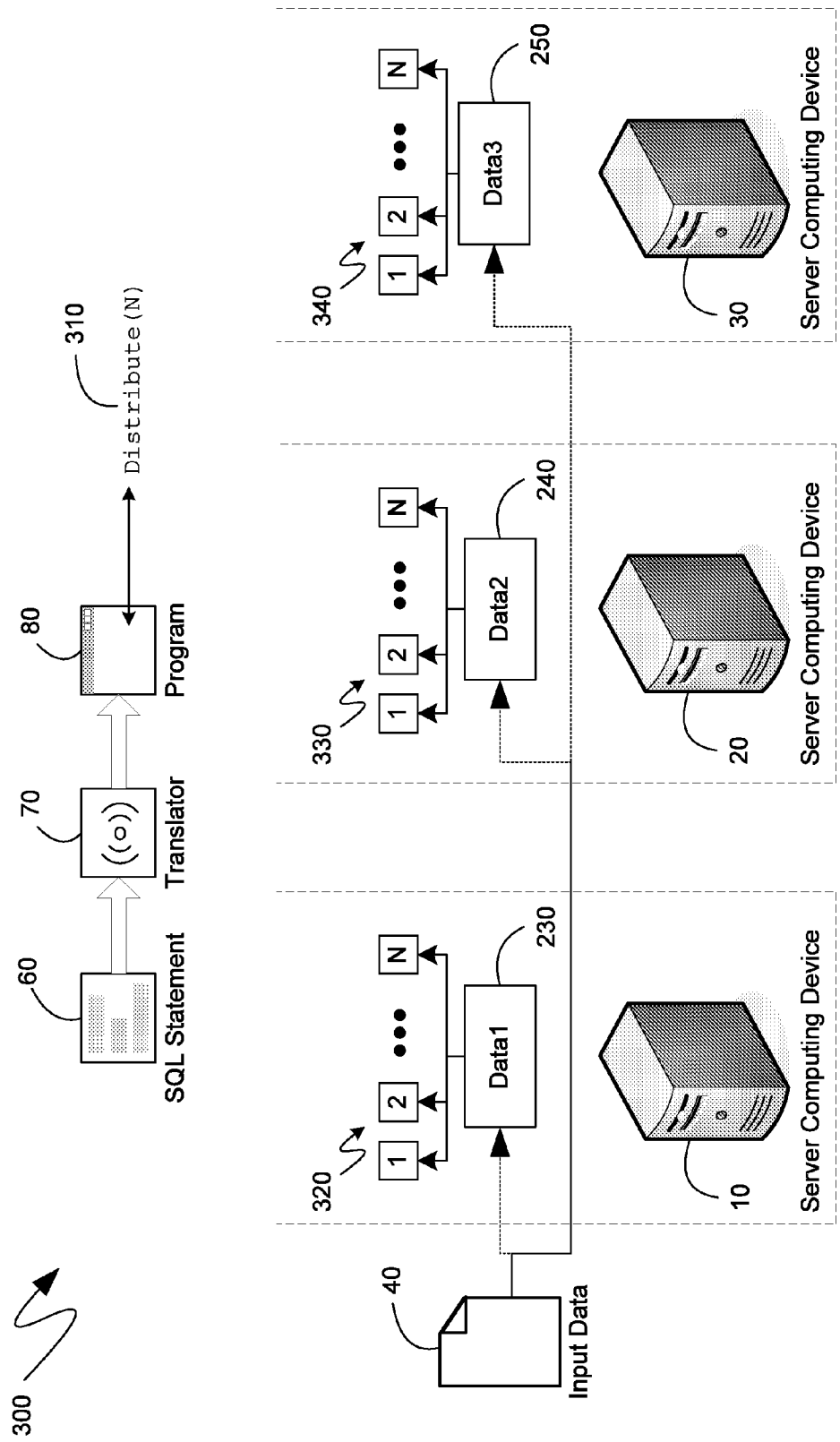
FIG. 4 is a block diagram of a "distribute" core command.

One such core command can enable the division, in parallel, of multiple segments of data into subdivisions according to one or more criteria that can be specified by a programmer. Such a core command, hereinafter referred to as the "distribute" command, is illustrated by the functional diagram 300 of FIG. 4. As shown, the use of the distribute command 310 in the program 80, together with a specification of a value, represented by the variable "N" in FIG. 4, enables a programmer to divide sections of data, in parallel, into as many subdivisions as specified by the value "N." For example, input data 40 can be distributed among multiple different processes operating in parallel, such as represented by the individual server computing devices 10, 20 and 30. Each distribution of data 230, 240 and 250 can then be divided into subdivisions 320, 330 and 340 by the server computing devices 10, 20 and 30, respectively, in parallel.

Figure 5:
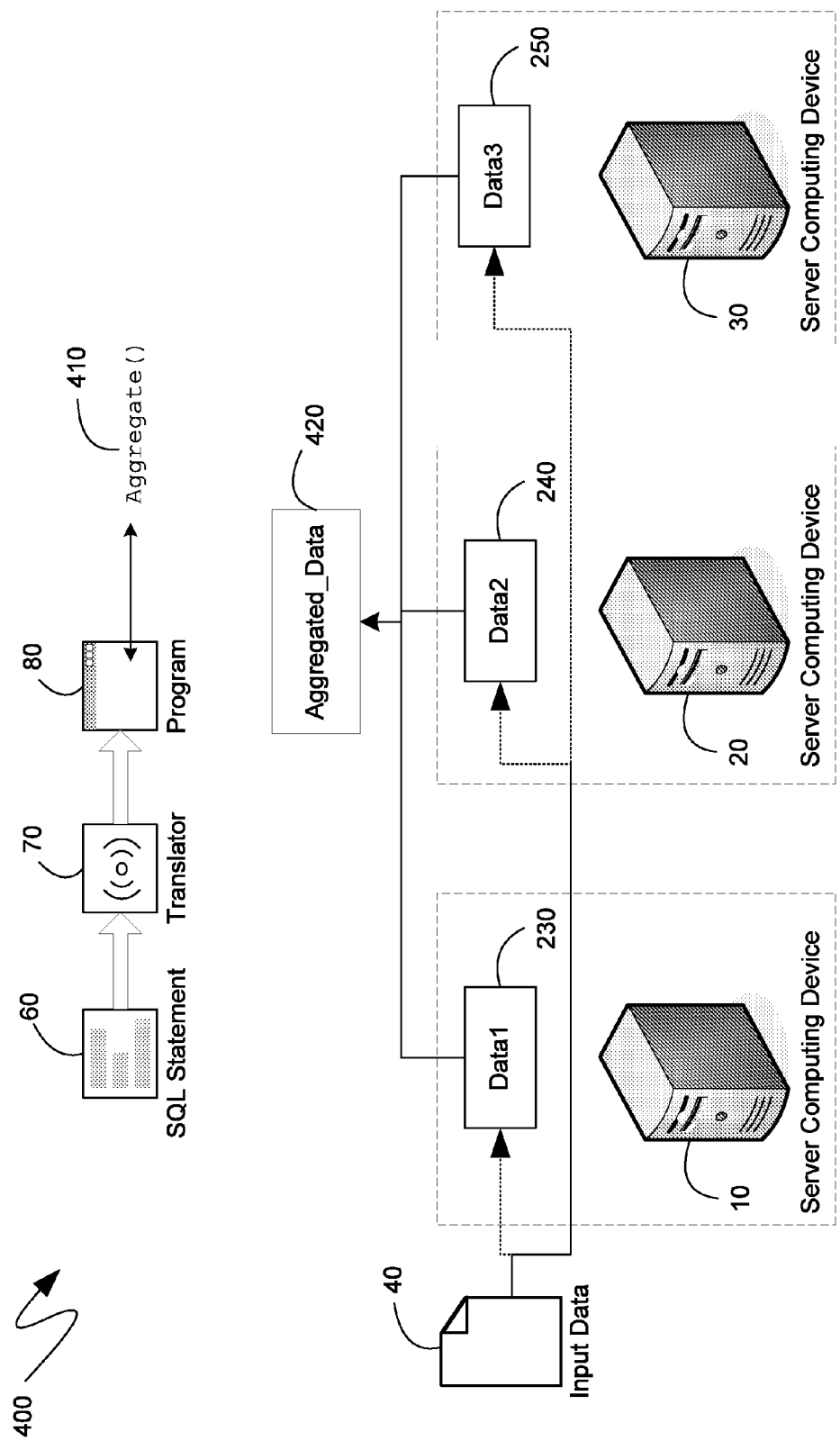
FIG. 5 is a block diagram of an "aggregate" core command.

In addition to dividing data into subsections, another operation common in the data processing field is the aggregation of two or more independent collections of data into a single data collection. Thus, another core command that can provide programmers with simplified access to commonly used commands is the "aggregate" core command, whose operation, in one embodiment, is illustrated by the functional diagram 400 of FIG. 5. As shown, the aggregate command 410, when used in program 80, can cause the server computing devices 10, 20 and 30, each having access to data segments 230, 240 and 250, respectively, to combine each of those data segments into a single data collection 420.

Figure 6:
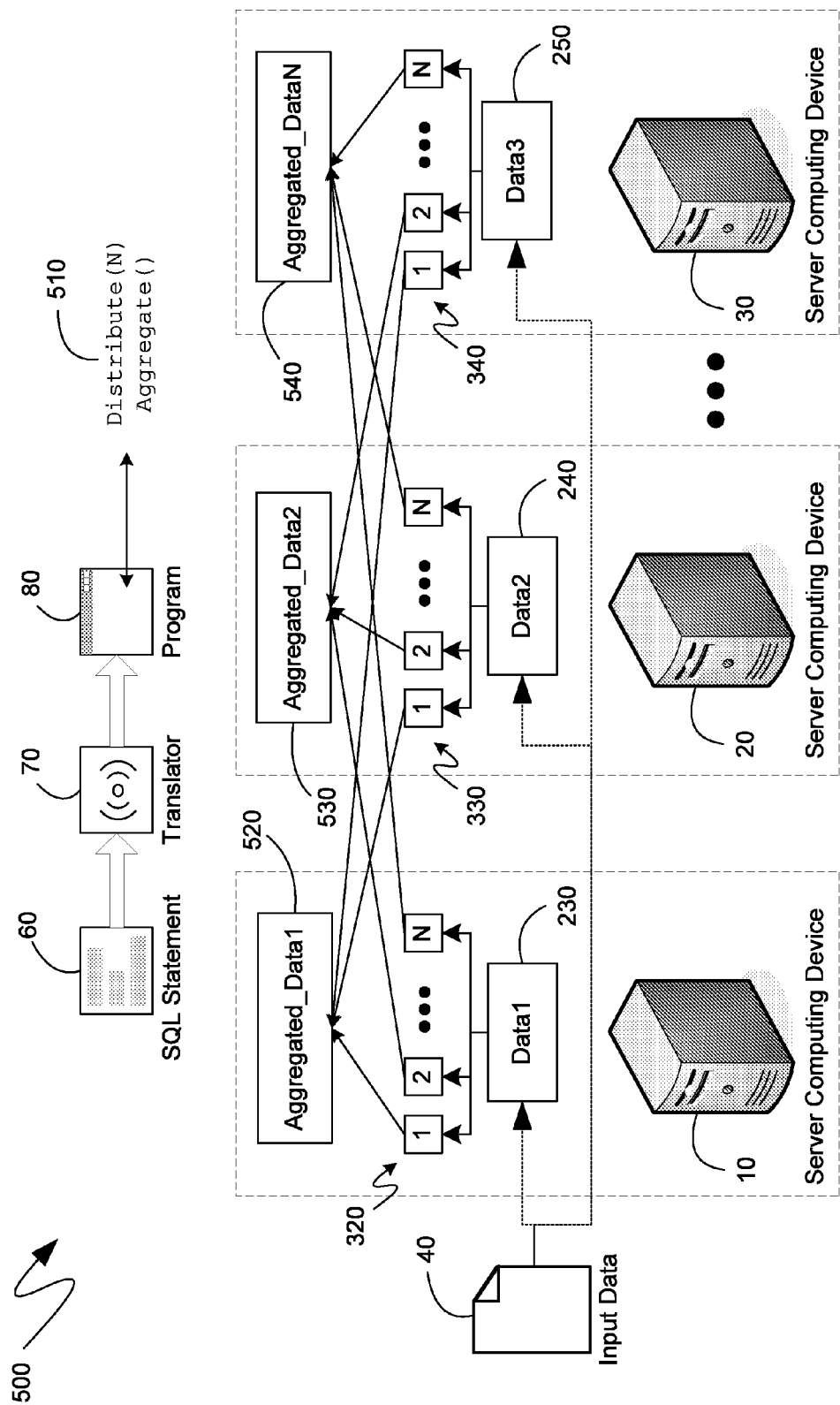
FIG. 6 is a block diagram of an "aggregate" core command when performed after a "distribute" core command.

In an alternative embodiment, the aggregate command 410 can perform a slightly different default function when it is used in combination with the previously described distribute command 310. Turning to FIG. 6, a functional diagram 500 is shown illustrating the operation of the distribute and aggregate commands when used together. Specifically, the combination of the distribute and aggregate commands 510 in program 80 can cause the data segments 230, 240 and 250, handled in parallel by the server computing devices 10, 20 and 30, respectively, to initially be divided into subdivisions 320, 330 and 340, respectively, and then subsequently aggregated into data collections 520, 530 and 540, respectively. Specifically, the subdivisions 320, 330 and 340 are aggregated by aggregating the first subdivision of subdivision 320 with the first subdivision of subdivisions 330 and 340 into the first aggregated data collection 520, by aggregating the second subdivision of subdivision 320 with the second subdivision of subdivisions 330 and 340 into the second aggregated data collection 530, and, in this manner aggregate all of the subdivisions 320, 330 and 340.

As will be recognized by those skilled in the art, the combination of the distribute and aggregate commands 510 illustrated in FIG. 6 is the often used mapping command, whereby a collection of data, whose parts are the data segments 230, 240 and 250, is sorted according to some specified criteria. Therefore, in one embodiment, the combination of the distribute and aggregate core commands can be abstracted by a mapping command performing in accordance with the functional diagram 500 of FIG. 6.

While the aggregate command 410 can combine data from multiple data sets output by a single prior command, or stored in a file, in another embodiment, core commands can be provided for the combining of data from multiple sets where each set was the output of a prior command. Thus, such core commands would be able to combine the outputs of two or more prior commands.

Figure 7:
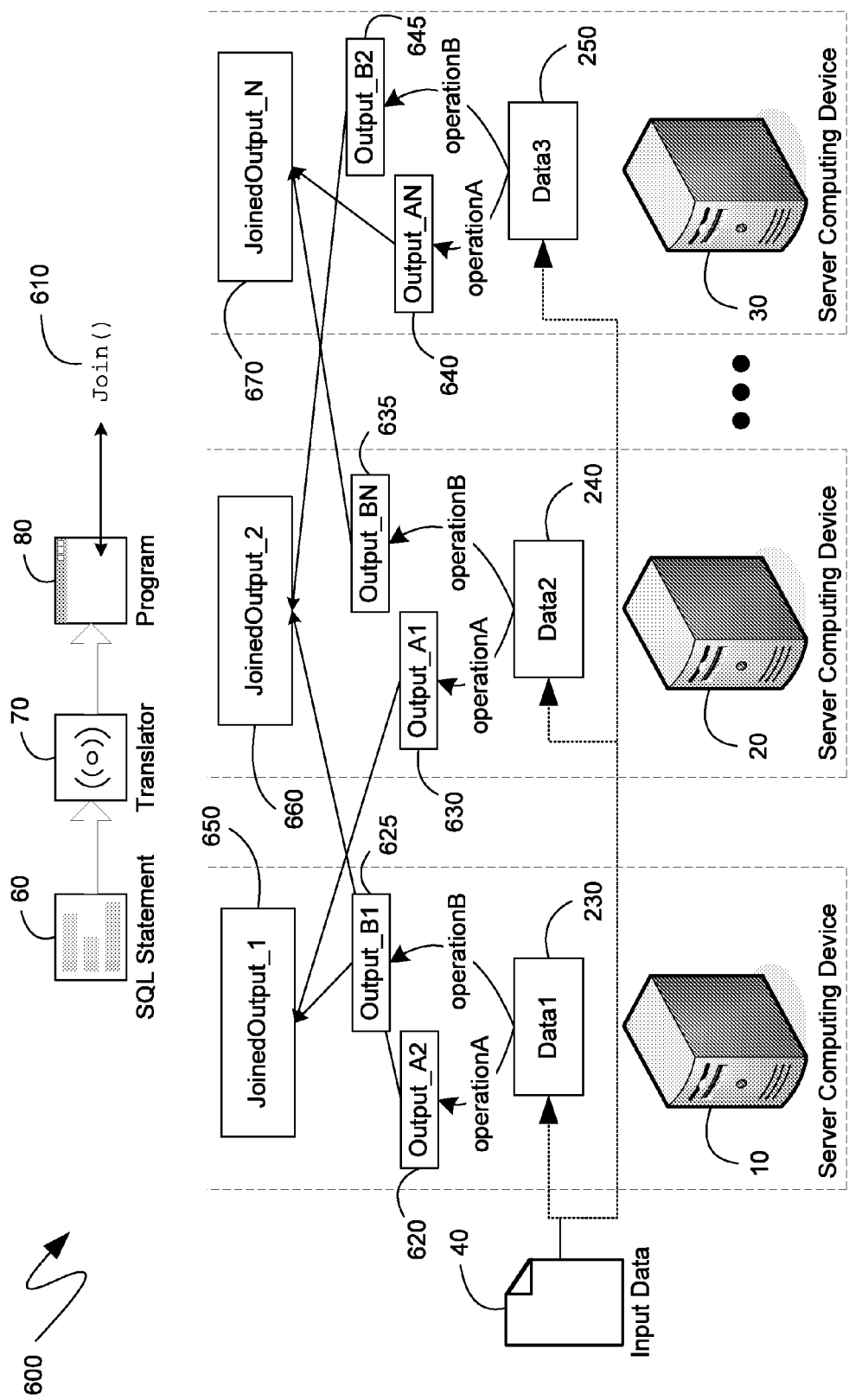
FIG. 7 is a block diagram of a "join" core command.

One such core command, illustrated by the functional diagram 600 of FIG. 7 can be the "join" core command. By using the join command 610 in the program 80, the programmer can cause the output of a first operation, previously performed and represented by output 620, 630 and 640, to be combined with the output of a second operation, also previously performed and represented by output 625, 635 and 645. More particularly, the results, termed "left" and "right", of the two prior operations are combined such that the primary "left" result is combined with the primary "right" result, the secondary "left" result is combined with the secondary "right" result, and continuing in such a manner until all the results have been combined. For example, as illustrated in FIG. 7, the primary output of the first operation 630 is combined with the primary output of the second operation 625, even though output 630 was generated by a different computing device than output 625. Similarly, the secondary output of the first operation 620 is combined with the secondary output of the second operation 645. Because of this pairing, in one embodiment, the join command is applicable to two prior operations that have the same number of results.

Another core command that can be provided for combining the output of two prior commands can be a "cross-product" core command that combines each data segment output by a first command with each data segment output by a second command. More specifically, a primary output of a first command could be combined with the primary output of a second command, the secondary output of the second command and, indeed, every output of the second command. Likewise, the secondary output of the first command could be combined with every output of the second command, with such combinations continuing for all of the outputs of the first command. Thus, the output segments produced by the cross-product core command can be equal to the product of the number of outputs of the first command and the number of outputs of the second command. Because of the nature of the combination performed by the cross-product core command, the number of outputs of the first and second commands do not need to be equal for the cross-product command to operate properly.

Figure 8:
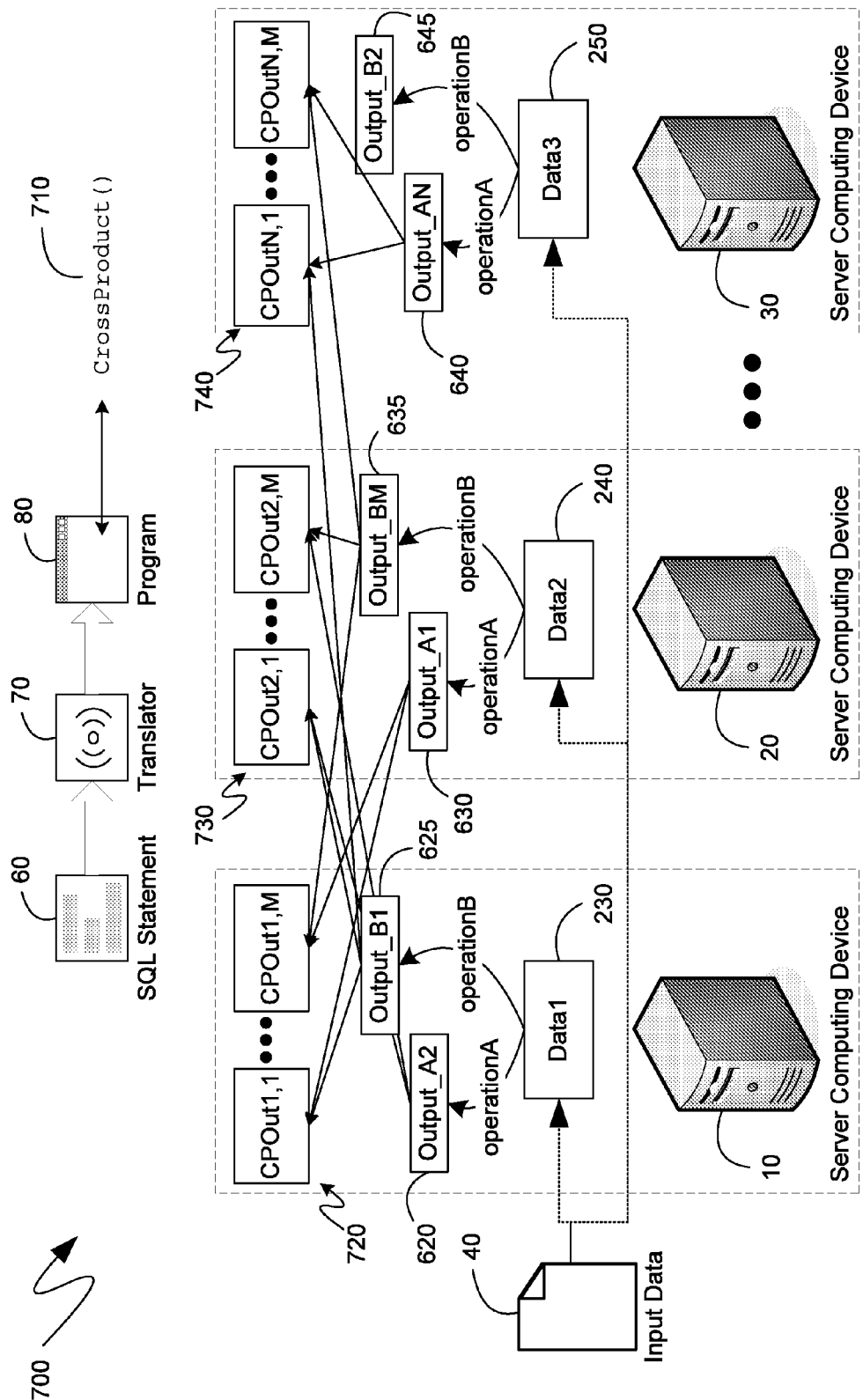
FIG. 8 is a block diagram of a "cross-product" core command.

Turning to FIG. 8, functional diagram 700 illustrates an exemplary operation of the cross-product command 710.

Specifically, as in FIG. 7, a first operation can generate output 620, 630 and 640, while a second operation can generate output 625, 635 and 645. However, as shown in FIG. 8, the cross-product command 710 can result in the combination of the first output of the first operation 630 being combined, not only with the first output of the second operation 625, as shown, but also with the second output of the second operation 645, and with all of the other outputs of the second operation, generically represented by the block 635. Similarly, the second output of the first operation 620 can be combined with the first output of the second operation 625, as shown, the second output of the second operation 645, and with all of the other outputs of the second operation 635. The cross-product command 710, therefore, results in multiple outputs 720, multiple outputs 730 and multiple outputs 740 across the processors performing the cross-product command in parallel, such as the server computing devices 10, 20 and 30, respectively.

In addition to the core commands described above, abstractions of the core commands can also be provided to enable easier access to commonly used versions of the core commands. One such abstraction can be the map command, described above, which abstracts a combination of the distribute and aggregate core commands. Another abstraction can be a "sort" command, which can be the process core command 210 used specifically to apply a sorting function in parallel. Such a sort command can mirror the process core command 210 described above, with the exception that the sort command specifically applies a sorting function to data segments in parallel. A further abstraction of a core command can be a "merge" command, which can be the aggregate core command 410 used specifically to aggregate sorted results of a prior operation. Another abstraction of the aggregate core command 410 in particular can be the "output" command, which can aggregate the results of a prior operation into a file or other output destination.

The above described core commands can enable a programmer to generate a program, such as program 80, that can be compiled into a form optimized for execution in parallel across multiple processors or processes. However, in many situations, the data processing desired to be performed on, for example, the input data 40, can be more efficiently expressed in terms of a structured query, such as a structured query generated using a language such as SQL. In such cases, rather than requiring the programming of the program 80, a translator 70 can automatically generate the program 80 from a structured query, such as the SQL statement 60. Consequently, the translator 70 can provide for the parallel-processing of the SQL statement 60, and all of the benefits attendant thereto, by leveraging the higher-level programming language supporting the above described core commands.

Figure 9:
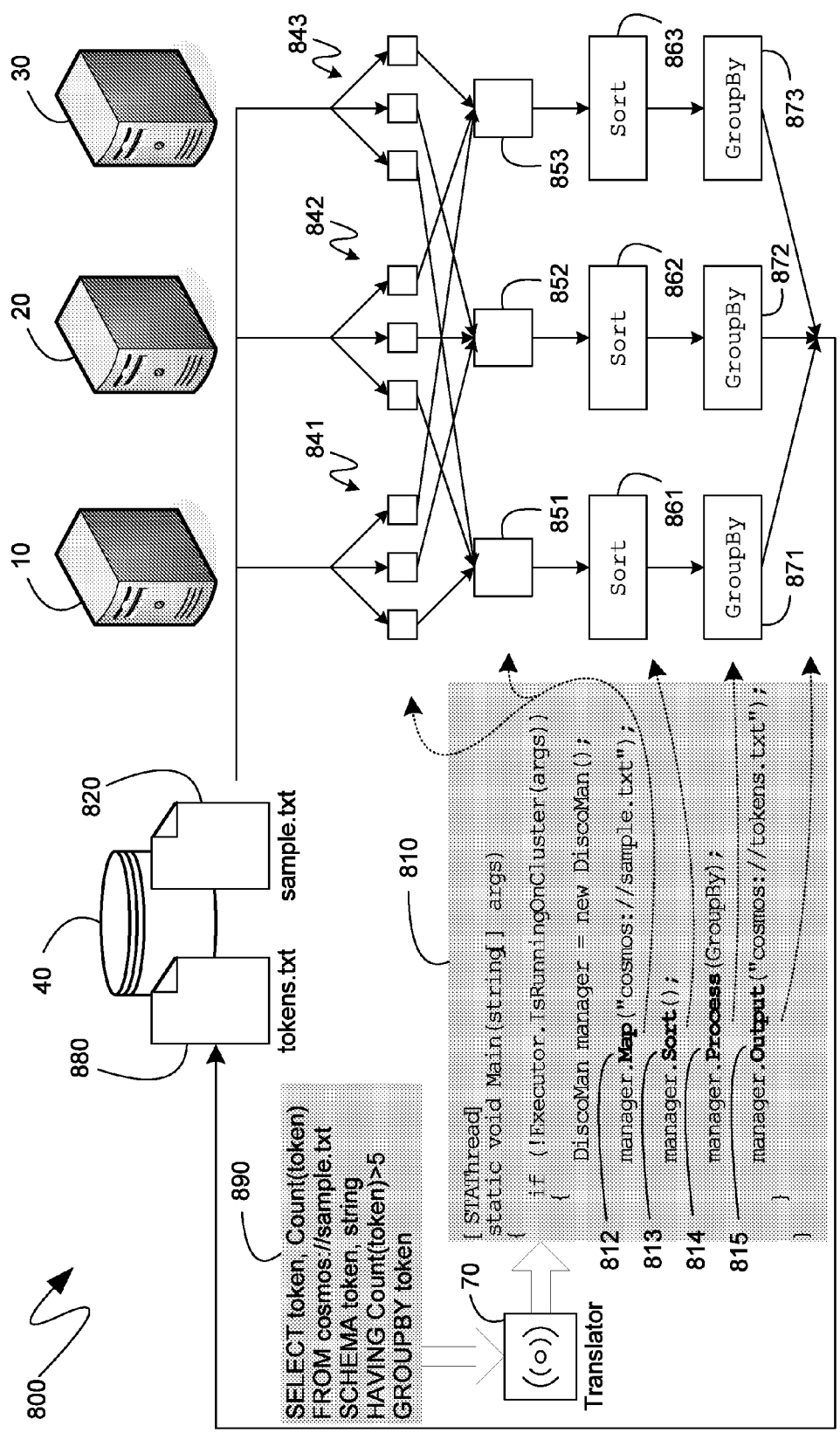
FIG. 9 is a block diagram illustrating the translation of a structured query.

Turning to FIG. 9, a functional diagram 800 is shown comprising a SQL statement 890, a program 810, the translator 70 and a functional illustration of the operations that can be performed by a compiled version of program 810. The exemplary SQL statement 890 shown in FIG. 9 comprises SQL commands directed to obtaining information from a file 820, entitled "sample.txt" in the illustrated example. Specifically, as will be known by those familiar with SQL, the exemplary SQL statement 890 requests a listing of all "tokens" that have more than five occurrences in the input file 820. Again, as indicated previously, if the input file 820 is several terabytes in size, such a request could require several hours or more to perform if performed by a single processor.

One non-standard SQL command that can be used in SQL statements, such as SQL statement 890 of FIG. 9, is the "SCHEMA" keyword. Because, as will be shown, the translator 70 can utilize the above described core commands, which include various comparison operations, such as sorting, joining and the like, there may exist a need to meaningfully interpret the data types of the data referenced by the SQL statement 890, such as input data 820. Consequently, a SCHEMA keyword can be provided to define the data types present in the input data 820. For example, in the illustrated sample SQL statement 890, the SCHEMA keyword can be followed by information indicating that the input data 820 comprises a single section, or "column", of data, and the data within that section can be referred to as "tokens". Additionally, the information presented as part of the SCHEMA keyword can further indicate that the "token" data is of a "string" type. Such information can enable more accurate processing of the data since, as will be known by those skilled in the art, the data type directly impacts the interpretation, and especially the comparison, of the data. For example, the entries "7" and "007" would be considered equivalent if they were stored as "integer" data, but would be considered different if they were stored as "string" data.

The translator 70 can receive, as input, the SQL statement 890, including customized keywords, such as the SCHEMA keyword, and can generate a functionally equivalent program 810, leveraging one or more of the above referenced core commands to enable the functions requested by the SQL statement to be efficiently executed in parallel. For example, in the illustrated example of FIG. 9, the program 810 can be generated by the translator 70 to initially reference a manager, termed "DiscoMan". The manager can provide the intelligence that accepts the above described core commands and aggregations, link them together in the manner specified by a program, such as program 810, and distribute them across multiple processes in a known, albeit complex, manner. By including the reference to the manager in the program 810, the translator 70 can utilize the manager to generate the low-level computer-executable instructions that can be executed in parallel by generating, from the SQL statement 890, the program 810 utilizing one or more of the above described core commands that are supported by the manager.

After referencing the manager, the program 810, generated by the translator 70 in accordance with the SQL statement 890, can specify a map command 812, which, as indicated previously, can be an aggregation of the distribute and aggregate core commands. The manager can, therefore, generate the appropriate instructions, in response to the map command 812, to cause the server computing devices 10, 20 and 30 to first distribute the input data from the file 820 into subsections 841, 842 and 843, respectively, and subsequently, to aggregate those subsections into sections 851, 852 and 853. Sections 851, 852 and 853 can comprise data from the file 820 mapped according to one or more criteria, such as the relative computational abilities of the servers computing devices 10, 20 and 30.

Once the data from file 820 has been mapped, a sort command 813 can be generated by the translator 70 to be part of the program 810. The sort command 813, as explained previously, can be a process command that applies a sorting function. Consequently, the manager defined previously as part of the program 810 can, upon compilation, generate the appropriate instructions to cause the server computing devices 10, and 30 to apply instances of a sorting function 861, 862 and 863, respectively to the data 851, 852 and 853, respectively.

In one embodiment, the default inputs for various core commands can be adjusted by the manager based on the order of the commands in the program 810. For example, as indicated previously, map command 812 precedes the sort command 813. Based on such an order, the manager can determine that the default input for the sort command 813 is the output of the map command 812, and can generate the underlying computing instructions appropriately. Generally, the default input for any core command can be the output for the prior command, though, as explained above, to maintain flexibility, core commands do enable a programmer to specify the input. Consequently, the translator 70 need not provide specified input for every command generated as part of the program 810 and can, instead, take advantage of the default inputs provided by the manager when the program 810 is compiled.

Turning back to exemplary program 810, the translator 70 can provide for the specification of a process command 814 applying the "GroupBy" function after the sorting command 813. The manager, therefore, can generate the instructions to cause the server computing devices 10, 20 and 30 to apply instances of this function 871, 872 and 873, respectively, to the output of the instances of the sorting function 861, 862 and 863, respectively. The use of the process command 814 in the program 810 to apply the "GroupBy" function to the sorted data output by the sort command 813 conforms to the SQL statement 890. Specifically, the SQL statement 890 requests the identification of all tokens having more than 5 instances in the input data 820. Such information can be obtained via the mapping and sorting performed by commands 812 and 813. The SQL statement 890, however, further requests that the identified tokens be grouped in a specific manner. Consequently, a "GroupBy" function can be applied, via the process command 814, to the output of the sorting command 813. In such a manner, the translator 70 can generate a program 810, utilizing one or more of the above described core commands, to implement a SQL statement 890.

The last command of the program 810 that can be generated by the translator 70 can be the output command 815 which can be used to aggregate the output of the instances of the "GroupBy" function 871, 872 and 873 into a tokens.txt file 880. Upon compilation of the program 810, therefore, the information requested by the SQL statement 890 can be stored, by the program 810 into an output file 880. In addition, to provide for the possibility that the program 810 may need to be tested, or otherwise executed, on a single computing device or process before being executed in parallel, an embodiment of the manager can implement a method that checks whether the code to be generated will be executed in parallel. Such a method can be used by the translator 70 when generating the program 810. For example, program 810 of FIG. 9 comprises a method termed "IsRunningOnCluster", that can determine whether the code will be executed in parallel. If the code will be executed in parallel, it can be generated in the manner just described. However, if the code is being compiled for execution on a single process, underlying mechanisms can take that into account and can generate code for a single process, as opposed to the distributed processes described.

Figure 10:
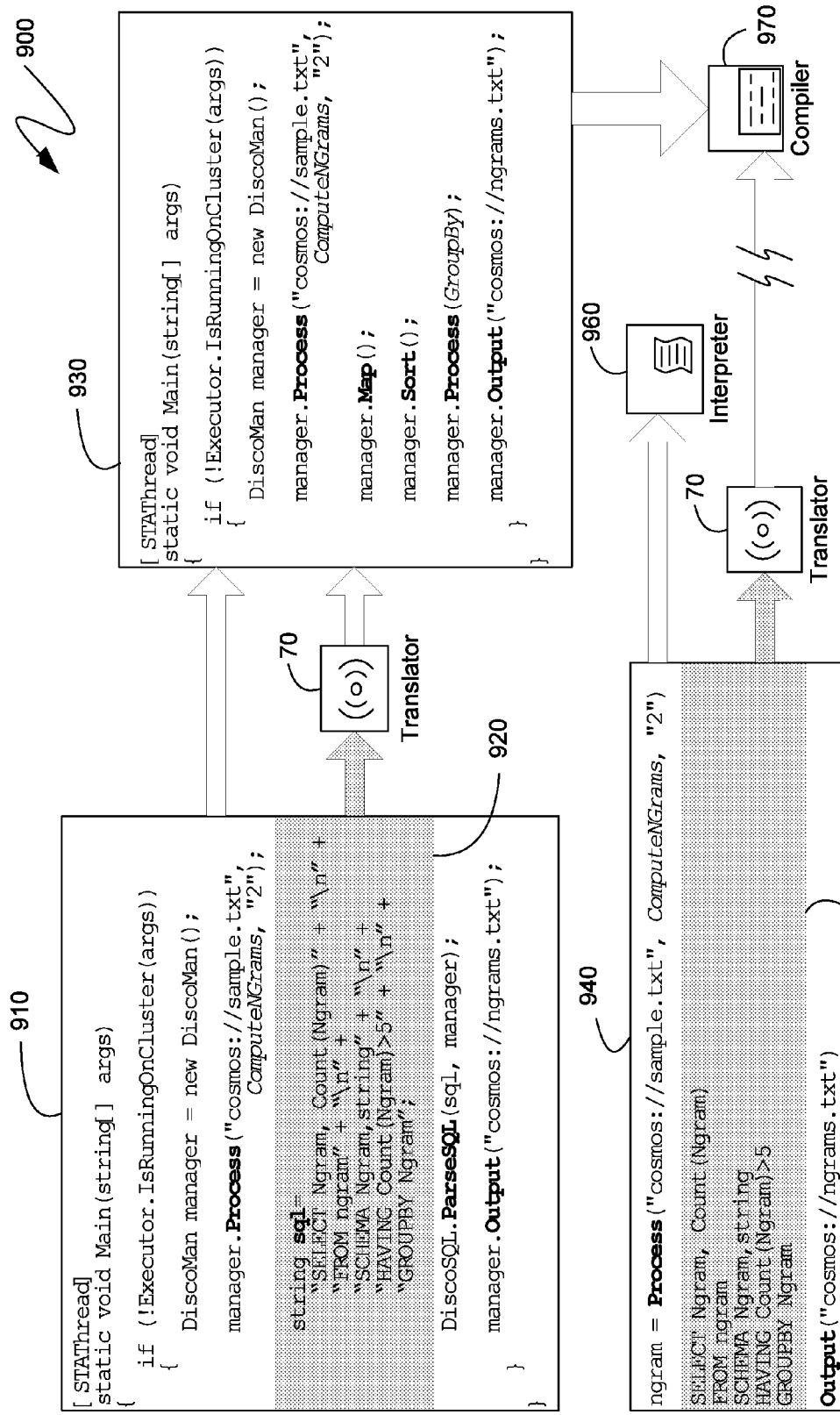
FIG. 10 is a block diagram illustrating support for embedded structured queries.

While FIG. 9 illustrates the generation of computer-executable instructions optimized for parallel-processing from a stand-alone SQL statement 890, the operation of the translator 70, as described above, is not so limited. Specifically, a program analogous to program 810 can be generated from a SQL statement analogous to SQL statement 890, even if such a SQL statement is included within, and as part of, a host programming context. Turning to FIG. 10, a program 910 and a script 940 are both illustrated as comprising SQL statements 920 and 950, respectively. The SQL statements 920 and 950 can be included directly within the programming context of the program 910 and the script 940, respectively. Thus, for example, SQL statement 920 is included as a "string" within the program 910, which is shown having a C# programming context in the illustrated example of FIG. 10. However, as indicated previously, the use of C# is strictly exemplary and is not a product of any inherent limitation. Indeed, the programming context of program 910 can be any higher-level computer programming language that provides for the specification of textual strings, including, for example, languages such as Visual Basic® or C++. The programming context of the script 940 is likewise not intended to be limited by the illustrated example of FIG. 10, which shows a SQL statement 950 included within a script 940 having a generic scripting context. In one embodiment, the SQL statement 950 can be included in the script 940 without any indicators, since the interpreter 960 of the script can interpret only the text that it understands.

As with the stand-alone SQL statement 890 of FIG. 9, the SQL statements 920 and 950, located within the program 910 and the script 940, respectively, can first be translated by a translator 70 into a form compatible with, or equivalent to, the programming context of the program 910 or the script 940. For example, as shown in FIG. 10, the SQL statement 920 can be translated by the translator 70 into a form that is equivalent to the programming context of the 910 which, in the illustrated example of FIG. 10, is the C# higher-level programming language. Thus, the resulting program 930 combines the C# code already present in the program 910 with the C# code resulting from the translation of the SQL statement 920. Again, as indicated, the translator 70 is not limited to translating the SQL statement 920 into only C#, but can instead be designed to translate the SQL statement into any commonly used higher-level programming language. In one embodiment, the translator 70 translates the SQL statement 920 into the same programming context as used by the program 910. In an alternative embodiment, however, the translator 70 can translate the SQL statement 920 into merely a compatible programming context. In such a case, the resulting program 930 can be compiled by multiple compilers, such as compiler 970, in order to generate computer-executable instructions optimized for parallel-processing.

If the translator 70 translates the SQL statement 920 into the same programming context as used by the program 910, then only a single compiler 970 is needed to generate computer-executable instructions optimized for parallel-processing. In one embodiment, the compiler 970 can reference the manager specified in the program 910, and 930, to generate such instructions. Thus, by translating the SQL statement 920 into a form for which a parallel-optimized compiler, such as compiler 970, already exists, the translator 70 can leverage the already existing compiler and need not have the capability to generate, directly from the structured query, the corresponding low-level computer-executable instructions optimized for parallel-processing.

The translator 70 can likewise translate the SQL statement 950, within the script 940, into an intermediate form from which the compiler 970 can generate computer-executable instructions optimized for parallel-processing. The script 940, however, instead of being compiled by the compiler 970, can instead be interpreted by an interpreter 960. In one embodiment, the interpreter 960 can utilize analogous libraries to the compiler 970, enabling the low-level computer-executable instructions optimizing for parallel-processing that are output from the interpreter 960 to be combinable with those output from the compiler 970. Ultimately, the output of the compiler 970, or the compiler and the interpreter 960 can be a collection of low-level computer-executable instructions that are optimized for parallel-processing and which process input data in a manner analogous to that shown in FIG. 9 and described in detail previously.

As can be seen from the above descriptions, mechanisms for enabling the use of structured queries, either alone or within another programming context are provided. The structured queries can be translated to take advantage of core commands and aggregations, provided for specific, fundamental operations, that enable the generation of executable programs optimized for parallel-processing. In view of the many possible variations of the subject matter described herein, we claim as our invention all such embodiments as may come within the scope of the following claims and equivalents thereto.

We claim:

1. One or more computer-readable storage media comprising computer-executable instructions for generating parallel-processing optimized computer-executable instructions from a host programming context comprising one or more structured queries and commands native to the host programming context, the computer-executable instructions directed to steps comprising:

parsing the one or more structured queries to identify an input data source;

parsing the one or more structured queries to identify a schema for the input data source, the schema specifying a name and a data type for one or more sections of data from the input data source;

translating, in accordance with the schema, the one or more structured queries into an intermediate form by selecting from a library of commands comprising: a process command for applying, in parallel across one or more processes, a function specified by the process command; a distribute command for dividing data, in parallel across one or more processes, into two or more subdivisions; an aggregate command for combining, in parallel across one or more processes, two or more discrete collections of data; a join command for combining, in parallel across one or more processes, each segment of a first join input data with a corresponding segment of a second join input data; and a cross-product command for combining, in parallel across one or more processes, each segment of a first cross-product input data with each segment of a second cross-product input data;

compiling the intermediate form into a first portion of the parallel-processing-optimized computer-executable instructions;

compiling, with the intermediate form, the commands native to the host programming context into a second portion of the parallel-processing-optimized computer-executable instructions if the host programming context is a program; and interpreting the commands native to the host programming context into the second portion of the parallel-processing-optimized computer-executable instructions if the host programming context is a script.

2. The computer-readable storage medium of claim 1, wherein the intermediate form comprises more commands native to the host programming context.

3. The computer-readable storage media of claim 1, wherein the compiling the intermediate form and the interpreting are performed in accordance with an identical library.

4. The computer-readable storage media of claim 1, wherein an output of a first portion of the host programming context is specified as an input of the one or more structured queries and wherein an output of the one or more structured queries is specified as an input of a second portion of the host programming context.

5. A method for generating parallel-processing optimized computer-executable instructions from a host programming context comprising one or more structured queries and commands native to the host programming context, the method comprising the steps of:

parsing the one or more structured queries to identify an input data source;

parsing the one or more structured queries to identify a schema for the input data source, the schema specifying a name and a data type for one or more sections of data from the input data source;

translating, in accordance with the schema, the one or more structured queries into an intermediate form by selecting from a library of commands comprising: a process command for applying, in parallel across one or more processes, a function specified by the process command; a distribute command for dividing data, in parallel across one or more processes, into two or more subdivisions; an aggregate command for combining, in parallel across one or more processes, two or more discrete collections of data; a join command for combining, in parallel across one or more processes, each segment of a first join input data with a corresponding segment of a second join input data; and a cross-product command for combining, in parallel across one or more processes, each segment of a first cross-product input data with each segment of a second cross-product input data;

compiling the intermediate form into a first portion of the parallel-processing-optimized computer-executable instructions;

compiling, with the intermediate form, the commands native to the host programming context into a second portion of the parallel-processing-optimized computer-executable instructions if the host programming context is a program; and interpreting the commands native to the host programming context into the second portion of the parallel-processing-optimized computer-executable instructions if the host programming context is a script.

6. The method of claim 5, wherein the intermediate form comprises more commands native to the host programming context.

7. The method of claim 5, wherein the compiling the intermediate form and the interpreting are performed in accordance with an identical library.

8. The method of claim 5, wherein an output of a first portion of the host programming context is specified as an input of the one or more structured queries and wherein an output of the one or more structured queries is specified as an input of a second portion of the host programming context.

* * * * *

UNITED STATES PATENT AND TRADEMARK OFFICE
CERTIFICATE OF CORRECTION

| | | |
|---|---|---|
| PATENT NO. | : 7,840,585 B2 | Page 1 of 1 |
| APPLICATION NO. | : 11/761407 | |
| DATED | : November 23, 2010 | |
| INVENTOR(S) | : William D. Ramsey et al. | |

It is certified that error appears in the above-identified patent and that said Letters Patent is hereby corrected as shown below:

In column 10, line 61, after "10," insert -- 20 --.

Signed and Sealed this
Twenty-sixth Day of July, 2011

David J. Kappos
*Director of the United States Patent and Trademark Office*